United States Patent
Clingerman et al.

(10) Patent No.: US 10,290,880 B2
(45) Date of Patent: May 14, 2019

(54) FUEL CELL CATHODE BALANCE OF PLANT FREEZE STRATEGY

(71) Applicant: GM GLOBAL TECHNOLOGY OPERATIONS LLC, Detroit, MI (US)

(72) Inventors: Bruce J. Clingerman, North Rose, NY (US); Aaron Rogahn, Davisburg, MI (US); Steven D. Burch, Honeoye Falls, NY (US); Michael Cartwright, Oxford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 819 days.

(21) Appl. No.: 14/260,199

(22) Filed: Apr. 23, 2014

(65) Prior Publication Data

US 2015/0311547 A1     Oct. 29, 2015

(51) Int. Cl.
| | |
|---|---|
| *H01M 8/04119* | (2016.01) |
| *H01M 8/04029* | (2016.01) |
| *H01M 8/04082* | (2016.01) |
| *H01M 8/04223* | (2016.01) |
| *H01M 8/0432* | (2016.01) |
| *H01M 8/0438* | (2016.01) |
| *H01M 8/04492* | (2016.01) |
| *H01M 8/04746* | (2016.01) |

(Continued)

(52) U.S. Cl.
CPC ... *H01M 8/04179* (2013.01); *H01M 8/04029* (2013.01); *H01M 8/0432* (2013.01); *H01M 8/04156* (2013.01); *H01M 8/04201* (2013.01); *H01M 8/04228* (2016.02); *H01M 8/04253* (2013.01); *H01M 8/04395* (2013.01); *H01M 8/04492* (2013.01); *H01M 8/04753* (2013.01); *H01M 8/04776* (2013.01); *H01M 2008/1095* (2013.01)

(58) Field of Classification Search
None
See application file for complete search history.

(56) References Cited

U.S. PATENT DOCUMENTS

| | | | | |
|---|---|---|---|---|
| 7,781,086 B2 * | 8/2010 | Goebel | ..................... | C01B 3/48 429/446 |
| 8,227,143 B2 | 7/2012 | Takeshita et al. | | |
| 8,603,690 B2 | 12/2013 | Burch et al. | | |

(Continued)

FOREIGN PATENT DOCUMENTS

WO     WO 2014078428 A1 *   5/2014   ............. B08B 9/032

*Primary Examiner* — Ula C Ruddock
*Assistant Examiner* — Anna Korovina
(74) *Attorney, Agent, or Firm* — Cantor Colburn LLP

(57) ABSTRACT

A system and method for a cathode subsystem in a fuel cell system. The system includes a fuel cell stack, a cathode inlet line that provides cathode air to a fuel cell stack and a cathode exhaust line that exhausts a cathode exhaust gas out of the fuel cell stack. Also included is a backpressure valve in the cathode exhaust line that is located downstream of a drip rail of the cathode exhaust line, where the drip rail includes a protrusion that prevents condensed water from building up near the backpressure valve. The drip rail further includes a sump that collects drips of condensed water from the protrusion of the drip rail. The system also includes a drain below a water vapor transfer unit that includes an orifice that is in a portion of the drain that is within the cathode exhaust line.

20 Claims, 4 Drawing Sheets

(51) Int. Cl.
*H01M 8/04228* (2016.01)
*H01M 8/1018* (2016.01)

(56) References Cited

U.S. PATENT DOCUMENTS

| | | | |
|---|---|---|---|
| 8,877,402 B2 | 11/2014 | Becker | |
| 2003/0148155 A1* | 8/2003 | Matthews | H01M 8/04029 |
| | | | 429/430 |
| 2007/0141418 A1* | 6/2007 | Ota | H01M 8/04253 |
| | | | 429/413 |
| 2008/0187803 A1* | 8/2008 | Menon | H01M 8/04014 |
| | | | 429/430 |
| 2009/0151248 A1* | 6/2009 | Bissonnette | A01G 31/02 |
| | | | 47/59 S |
| 2010/0104909 A1* | 4/2010 | Takeshita | H01M 8/04201 |
| | | | 429/412 |
| 2010/0219066 A1* | 9/2010 | Takeuchi | C25B 1/04 |
| | | | 204/242 |
| 2011/0183225 A1* | 7/2011 | Harris | H01M 8/04455 |
| | | | 429/443 |
| 2011/0195344 A1* | 8/2011 | Goebel | H01M 8/04089 |
| | | | 429/512 |
| 2014/0093801 A1 | 4/2014 | Rogahn et al. | |

\* cited by examiner

FUEL CELL CATHODE BALANCE OF PLANT FREEZE STRATEGY

BACKGROUND OF THE INVENTION

Field of the Invention

This invention relates generally to a system and method for selectively providing a freeze strategy for a cathode subsystem of a fuel cell stack and, more particularly, to a system and method for selectively providing a freeze strategy that prevents freezing of components in the balance of plant of the cathode subsystem.

Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode of one or more end cells cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

A fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective side of the MEA. Cathode gas flow channels are provided on the cathode side of the bipolar plates that allow the cathode reactant gas to flow to the respective side of the MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

As is well understood in the art, fuel cell membranes operate with a controlled hydration level so that the ionic resistance across the membrane is low enough to effectively conduct protons. The relative humidity (RH) of the cathode outlet gas from the fuel cell stack is typically controlled to control the hydration level of the membranes by controlling several stack operating parameters, such as stack pressure, temperature, cathode stoichiometry and the relative humidity of the cathode air into the stack. It is known in the art to recover water from the cathode exhaust stream and return it to the stack via the cathode inlet airflow. Many devices could be used to perform this function, such as a water vapor transfer (WVT) unit. By holding a particular set-point for cathode outlet relative humidity, for example 80%, the proper stack membrane hydration level can be maintained.

It is known in the art to provide high frequency resistance (HFR) measurements of the membranes in a fuel cell stack to provide an accurate measurement of the water or membrane hydration in the fuel cell stack. HFR measurement systems provide a high frequency component on the electrical load of the stack, which operates to create a high frequency ripple on the current output of the stack. The resistance of the high frequency component is measured, which is a function of the amount of water in the stack membranes.

At fuel cell system shut-down, it is desirable that the membranes have a certain hydration level so they are not too wet or too dry. This is typically accomplished by purging the cathode side of the stack with dry air for a certain period of time. In one known technique, the purge of the anode side occurs by air being forced through the membranes from the cathode side. Too much water in the stack may cause problems for low temperature environments where freezing of the water could produce ice that blocks flow channels and affects the restart of the system. However, too long of a purge could cause the membranes to become too dry where the membranes will have too low of a protonic conductivity at the next system restart that affects restart performance as well as reduces the durability of the stack. The actual target amount of grams of water in the stack will vary depending on the system and certain system parameters.

For a fuel cell stack having three hundred fuel cells, and an active area near 400 $cm^2$ per cell, the stack may have about two hundred grams of water when the system is shut down. It is desirable that a stack of this size have about twenty-three grams of water after system shut-down so that the membranes are properly hydrated. Twenty-three grams of water is a stack $\lambda$ of three, where $\lambda$ represents the membrane hydration defined as the number of water molecules for each sulfonic acid molecule in the membrane for each fuel cell. By knowing how much water is actually in the fuel cell stack at system shut-down, a desirable air purge flow rate and air purge duration can be provided so that the target value of $\lambda$, such as $\lambda=3$ can be achieved. Models can be employed to estimate the amount of water in the stack based on stack operating parameters during operation of the fuel cell system.

If a fuel cell stack has too much water in it from the last system shut-down, the water generated during a long start-up may block gas flow channels. Typically, the colder the stack is at start-up the longer it takes to adequately heat up the stack and the more likely that the water generated during start up will block the gas flow channels. Therefore, at very cold start-up temperatures, such as below −15° C., it takes longer for the fuel cell stack to heat up to 0° C. Consequently, the shut-down process becomes very critical for a successful restart of the fuel cell stack, particularly when the fuel cell stack temperature is −15° C. or colder.

In addition to preventing excessive water from freezing in a fuel cell stack, it is also desirable to prevent excessive water from freezing in the critical areas of the balance of plant of the cathode subsystem. The balance of plant refers to components that are part of the cathode subsystem other than the cathode side of the fuel cell stack. Thus, there is a need in the art to provide a low cost cathode subsystem and a method of operating such that the cathode subsystem operates reliably at −40° C. ambient temperature.

SUMMARY OF THE INVENTION

In accordance with the teachings of the present invention, a system is disclosed for a cathode subsystem in a fuel cell system that includes a fuel cell stack, a cathode inlet line that provides cathode air to a fuel cell stack and a cathode exhaust line that exhausts a cathode exhaust gas out of the fuel cell stack. Also included is a backpressure valve in the cathode exhaust line that is located downstream of a drip rail of the cathode exhaust line, where the drip rail includes a protrusion that prevents condensed water from building up near the backpressure valve. The drip rail further includes a sump that collects drips of condensed water from the protrusion of the drip rail.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for selectively providing a freeze strategy of a cathode subsystem is merely exemplary in nature, and is in no way intended to limit the invention or its applications or uses. For example, the present invention has particular application for a fuel cell system on a vehicle. However, as will be appreciated by those skilled in the art, the system and method of the invention will have application for other fuel cell systems and other applications.

Figure 1:
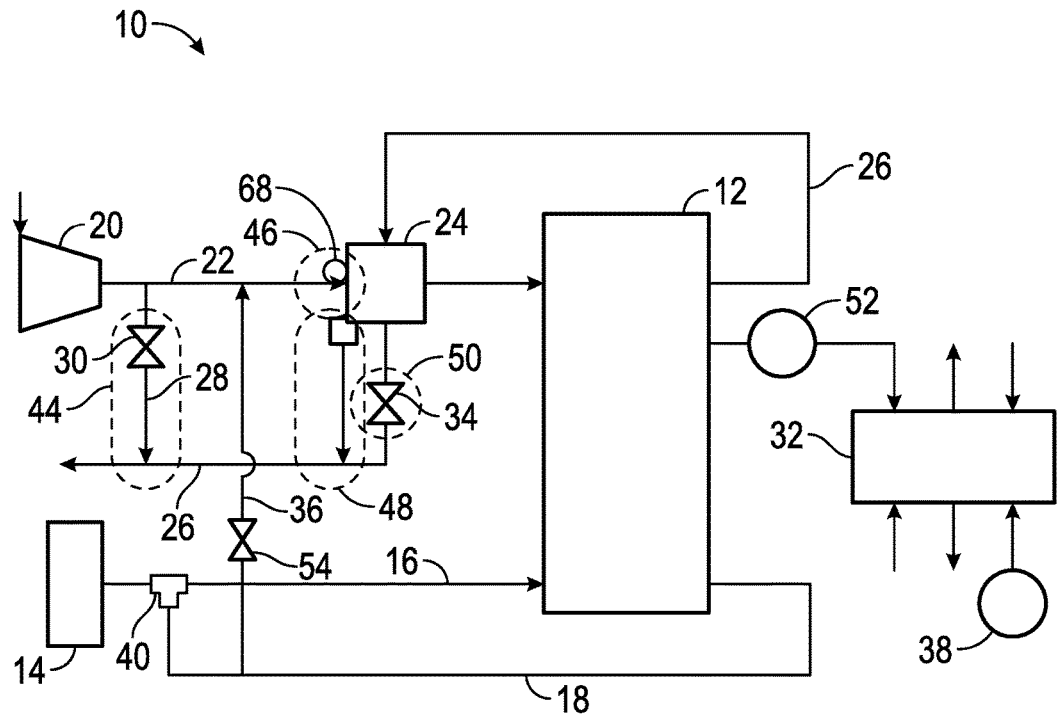
FIG. 1 is a schematic block diagram of a fuel cell system.

FIG. 1 is a schematic block diagram of a fuel cell system 10 including a fuel cell stack 12. The fuel cell stack 12 receives hydrogen gas from a hydrogen source 14 on an anode input line 16 and an anode exhaust gas is exhausted from the stack 12 on an anode exhaust gas recirculation line 18 and recirculated to the stack 12 using, for example, an injector/ejector 40. A compressor 20 provides an air flow to the cathode side of the fuel cell stack 12 on a cathode input line 22 through a water vapor transfer (WVT) unit 24 that humidifies the cathode input air. A cathode exhaust gas is output from the stack 12 on a cathode exhaust gas line 26. The cathode exhaust gas line 26 directs the cathode exhaust to the WVT unit 24 to provide the water to humidify the cathode input air. The cathode exhaust line 26 includes a backpressure valve 34 to control pressure in the cathode side of the stack 12 in a manner known to those skilled in the art. A by-pass line 28 with a by-pass valve 30 is provided to allow cathode inlet air to be directed to the cathode exhaust gas line 26, as is described in more detail below. A line 36 that includes a valve 54 selectively provides hydrogen to the cathode input line 22 as desired, such as during cathode catalytic heating, in a manner known to those skilled in the art.

A controller 32 controls the by-pass valve 30, the compressor 20, the backpressure valve 34 and the injector 40, and the controller 32 receives inputs from the various sensors that are part of the system 10, such as pressure sensor 68 and temperature sensors 52 and 38, discussed in detail below. A water buffer model in the controller 32 is used to calculate how much by-product water is generated by the stack 12 in a manner known to those skilled in the art. High frequency resistance (HFR) measurements may also be used to determine the hydration of membranes in the stack 12 in a manner known to those skilled in the art. The fuel cell stack temperature sensor 52 provides a temperature measurement of the fuel cell stack 12 and the ambient temperature sensor 38 provides an ambient temperature measurement.

The by-pass line 28 and the by-pass valve 30 allow cathode inlet air, which is typically dry, to be added to the cathode exhaust on the cathode exhaust line 26. There may be several reasons to add cathode inlet air to the cathode exhaust using the by-pass line 28, for example, to dilute hydrogen in the cathode exhaust. Because the air passing through the by-pass line 28 is typically very dry, it was thought that freezing of the valve 30 would not be an issue. However, research has shown that this valve may freeze, possibly due to back splash of water that is in the cathode exhaust line 26.

Figure 2:
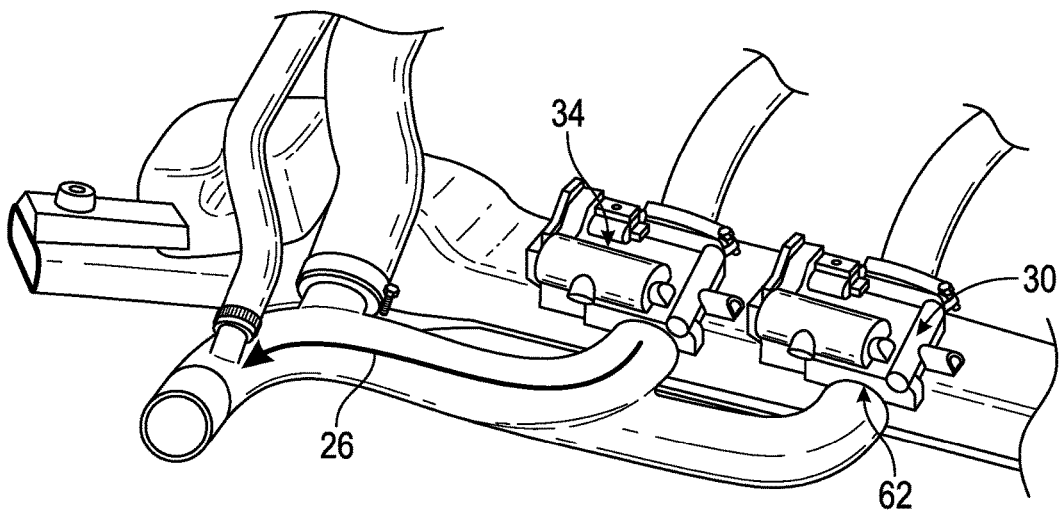
FIG. 2 is an isometric view of a by-pass valve and a cathode exhaust backpressure valve.

FIG. 2 is an isometric view of the by-pass valve 30 in the by-pass line 28 and the backpressure valve 34 in the cathode exhaust line 26. Area 62 is where the backsplash of water from the cathode exhaust line 26 occurs, thereby freezing the by-pass valve 30. Thus, the by-pass valve 30 must be placed at a location that is spaced apart from the wet cathode exhaust stream in the cathode exhaust line 26 to prevent product water from back splashing, freezing and locking the valve 30 shut.

Figure 3:
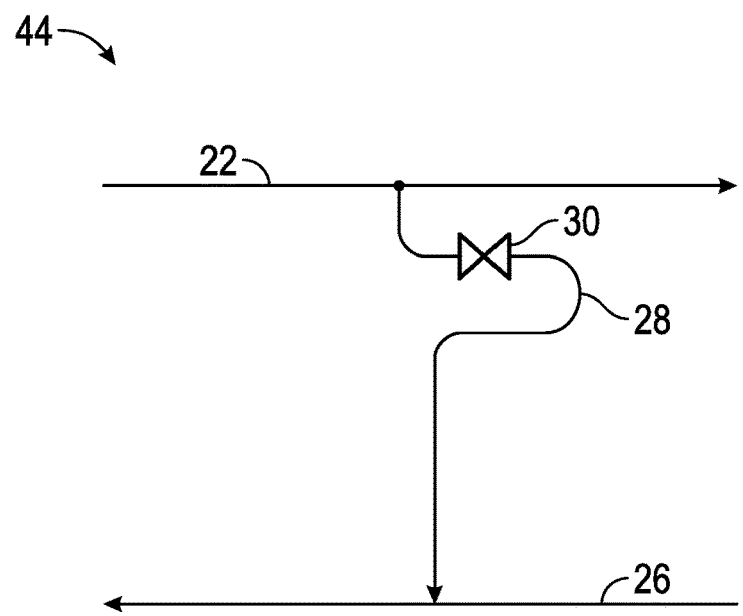
FIG. 3 is an exploded view of a region of the cathode subsystem.

FIG. 3 is an exploded view of region 44 shown in FIG. 1. As shown, the by-pass valve 30 is spaced apart from the cathode exhaust line 26. The furthest possible point is optimal. Additionally, the more turns that are in the by-pass line 28 the better for preventing the valve 30 from freezing. By way of example, if only one 90° turn is in the by-pass line 28, it is desirable to have a distance of 20 inches or more between the by-pass valve 30 and the exhaust line 26 to minimize the possibility of water back splashing against the by-pass valve 30.

It is important to ensure that the by-pass valve 30 is operable at system 10 startup because it may be necessary to open the valve 30 to dilute hydrogen in the cathode exhaust line 26. As is known to those skilled in the art, hydrogen may be added to the cathode inlet line 22 using the line 36 upon startup of the system 10 to heat the fuel cell stack 12 using cathode catalytic heating. This may cause the percentage of hydrogen exiting the system 10 to exceed predetermined limits. Thus, the by-pass valve 30 must be able to dilute the hydrogen in the cathode exhaust line 26 with cathode inlet air before it exits the system 10, i.e., the by-pass valve 30 must be operable at system startup.

Figure 4:
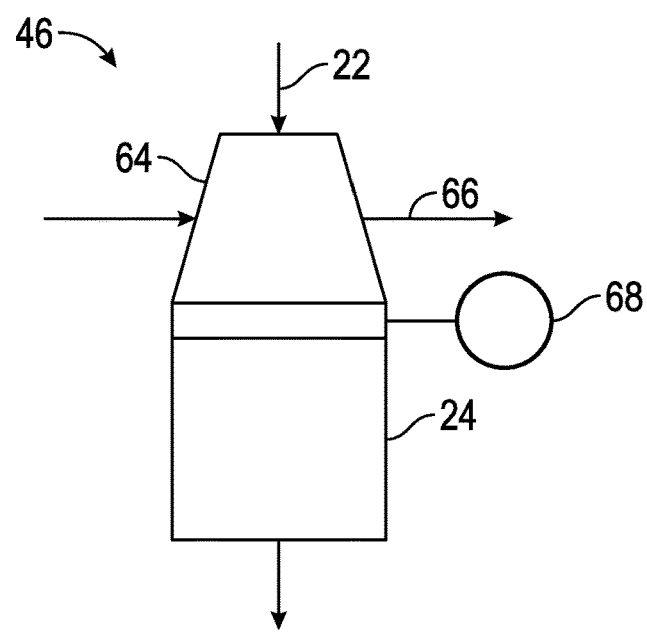
FIG. 4 is an exploded view of another region of the cathode subsystem.

FIG. 4 is an exploded view of region 46 shown in FIG. 1. The cathode inlet line 22 feeds into a charge air cooler 64 that operates to cool the cathode air from the line 22 using a coolant line 66 in a manner known to those skilled in the art. Through research it has been discovered that strategic placement of the pressure sensor 68 that measures the pressure of the cathode air is critical to avoid faulty pressure sensor readings due to water freezing on components of the pressure sensor 68, which may cause faulty readings. Readings from the pressure sensor 68 are used to model estimates of pressure drop across the water vapor transfer unit (WVT) 24 and the charge air cooler 64 as well as to predict stack in and compressor out pressures. It is known to place the pressure sensor 68 in the portion of the cathode inlet line 22 that is between the WVT unit 24 and the stack 12. However, because the WVT unit 24 adds water to the cathode inlet line 22, it has been found that water may freeze on the pressure sensor 68 and cause faulty readings as stated above. Providing the pressure sensor 68 in a region of the cathode inlet line 22 that is closer to the compressor 20 than the region of the charge air cooler 64 that is shown in FIG. 4 is also problematic because in hot, humid conditions such as a hot summer day, the temperature of the cathode inlet air coming out of the compressor 20 may be too high for the pressure sensor 68 to provide an accurate reading. The temperature of the cathode air coming from the compressor 20 may be, for example, 150° C., which is too high for the temperature rating of common pressure sensors that may be used as the pressure sensor 68. To avoid using a more expensive pressure sensor with a higher temperature rating and/or a sensor with a heater, it has been found to be important to place the pressure sensor 68 in the cathode inlet line 22 at the region downstream of the charge air cooler 64 and upstream of the WVT unit 24, as is shown in FIG. 4.

Figure 5:
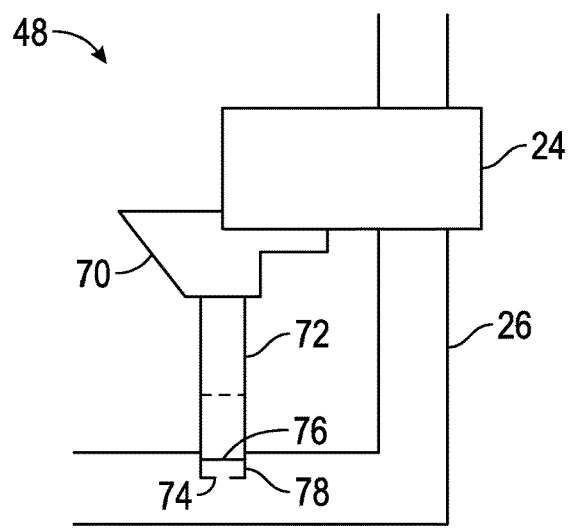
FIG. 5 is an exploded view of another region of the cathode subsystem.

FIG. 5 is an exploded view of region 48 shown in FIG. 1. As discussed above, the WVT unit 24 is used to humidify cathode inlet air in the cathode inlet line 22. However, it is desirable to provide only water vapor to the fuel cell stack 12 and not liquid water because, for example, liquid water may block flow channels that are in the fuel cell stack 12, as is known to those skilled in the art. To avoid adding liquid water, a drain 70 may be included to capture liquid water in a sump region 72 of the drain 70. A valve is not included in the drain 70 because a valve would require additional costs and may freeze. Instead, an orifice 74 is provided at the bottom of the drain. Pressure from the cathode air flow pushes the water captured by the drain 70 through the orifice 74 and into the cathode exhaust line 26. It is anticipated that a small amount of air from the cathode air flow may escape through the orifice 74, however the amount of air lost is expected to be small enough that it does not impact fuel economy of the system 10 because the compressor 20 does not have to work that much harder to make up for the lost air. A filter 76 is provided in the drain 70 near the orifice 74 to prevent particles from clogging the orifice 74.

At shutdown of the system 10 the cathode subsystem is typically purged of water, as is known to those skilled in the art. However, water may still accumulate and freeze near the orifice 74. To clear the drain 70 and the orifice 74 of ice shortly after startup of the fuel cell system 10, the region of the drain 70 that includes the filter 76 and the orifice 74 extends down into the cathode exhaust line 26 so that heat from the cathode exhaust gas may thaw the orifice 74. It is expected that the sump 72 will be free or at least partially free from ice, therefore the system 10 may be started without requiring ice that may have formed around the orifice 74 be thawed first. To quickly thaw the orifice 74 after startup of the system 10, a region 78 of the drain 70 may be made of a thermally conductive material such as a thermally conductive metal so that the heat from the cathode exhaust gas is quickly transferred to thaw the orifice 74. It is desirable that the region 78 is in the cathode exhaust so as to avoid exposure of the thermally conductive material to cold air. Alternatively, the region 78 may be insulated if it extends out of the cathode exhaust. When hot water droplets that are in the cathode exhaust gas, which have a high heat capacitance, hit the thermally conductive region 78, any water that has frozen in the region 78 is expected to thaw. Furthermore, delta pressure (dP) in the drain to help clear ice when the ice becomes thin enough to be pushed out. As long as the orifice 74 is able to drain water before the drain 70 fills with water, it is expected that the fuel cell system 10 will function properly. A two stage drain freeze strategy that includes an initial drain and bulk water removal, followed by a stack purge and then a second drain to eliminate additional water from the stack purge may also be used to ensure that water is not in the drain at shutdown.

Figure 6:
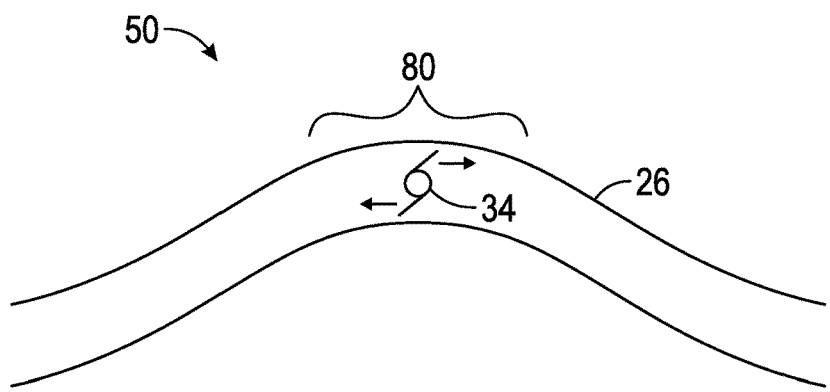
FIG. 6 is an exploded view of another region of the cathode subsystem that includes a backpressure valve.

FIG. 6 is an exploded view of region 50 shown in FIG. 1. The cathode backpressure valve 34 in the cathode exhaust line 26 as shown in FIG. 6 is an inverted P-trap valve that is placed in a hill region 80 in the cathode exhaust line 26 such that gravity pulls water away from the valve 34, thereby preventing the valve from freezing. The hill region 80 must have enough rise to account for changes in incline that the fuel cell system 10 may experience. For example, vehicles that include the system 10 that are parked in a driveway with an incline. By way of example, a 17° grade may be accounted for by the hill region 80. Unfortunately, not all fuel cell systems are able to use the design shown in FIG. 6 due to packaging constraints. Thus, another technique may be needed to prevent freezing of the backpressure valve 34.

Figure 7:
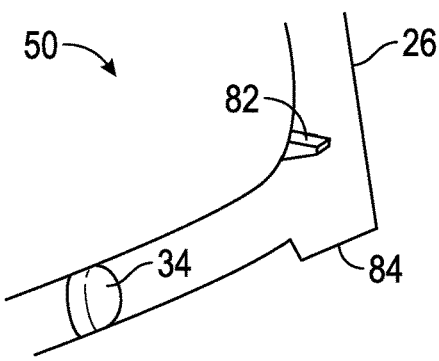
FIG. 7 is an exploded view of the cathode subsystem that includes a backpressure valve according to another embodiment.

FIG. 7 is also an exploded view of the region 50 and is another design that may be used to prevent the backpressure valve 34 in the cathode exhaust line 26 from freezing. According to this design, the backpressure valve 34 is provided in the cathode exhaust line 26 in a region that is downstream from a drip rail 82. The drip rail 82 includes a protrusion that keeps condensed water from converging into the backpressure valve 34 in a passive, non-electrical manner. The drip rail 82 may be tapered to ease the mold from releasing. The drips of water fall from the drip rail 82 to a shallow sump 84. The sump 84 is designed to be shallow enough such that the sump 84 can be cleared of water during normal fuel cell system 10 operation. By way of example, the sump 84 may hold approximately 5 cc of water. The optimal amount of water held by the sump 84 will depend on system design.

The drip rail 82 must be long enough to account for changes in incline that the fuel cell system 10 may experience, for example, vehicles that include the system 10 that are parked in a driveway with an incline. By way of example, a 17° grade may be accounted for by the drip rail 82. A steeper grade may be accounted for by increasing the length of the drip rail. For example, if FIG. 7 was rotated 17° counter-clockwise, drops of water still need to fall into the sump 84. Thus the drip rail 82 must be capable of accounting for the tilt.

As will be discussed in detail below, the controller 32 may perform a shut-down process of the fuel cell system 10 that selectively determines whether a freeze purge will be performed based on various factors so that the freeze purge is not performed unless it is necessary, and thus system resources, such as hydrogen fuel, can be efficiently used, and RH cycling of the membranes can be reduced to increase stack durability. As discussed above, a freeze purge is an extended purge when the system 10 is keyed off that causes the system 10 to continue running for some period of time after system shut-down. It will be understood that the freeze purge discussed herein is more robust to below freezing startups than the short quick purge that removes water from the flow channels of the stack 12 that is performed at every shut-down unless the freeze purge is performed. Some of the factors considered may be whether the regions 44, 46, 48 and 50 may be experiencing freezing of their respective components, as discussed above. A system 10 with one or more of the components described in regions 44, 46, 48 and 50 discussed above may be tested to find out which region is most likely to experience freeze issues, i.e., which component in the cathode subsystem is weakest. When the weakest component is identified, a temperature sensor is placed near the weakest region identified, or the temperature for that region is modeled using an algorithm of the controller 32 to determine when a freeze of the weak component is likely. For example, the backpressure valve 34 may be the weakest component in the system 10 described above.

Figure 8:
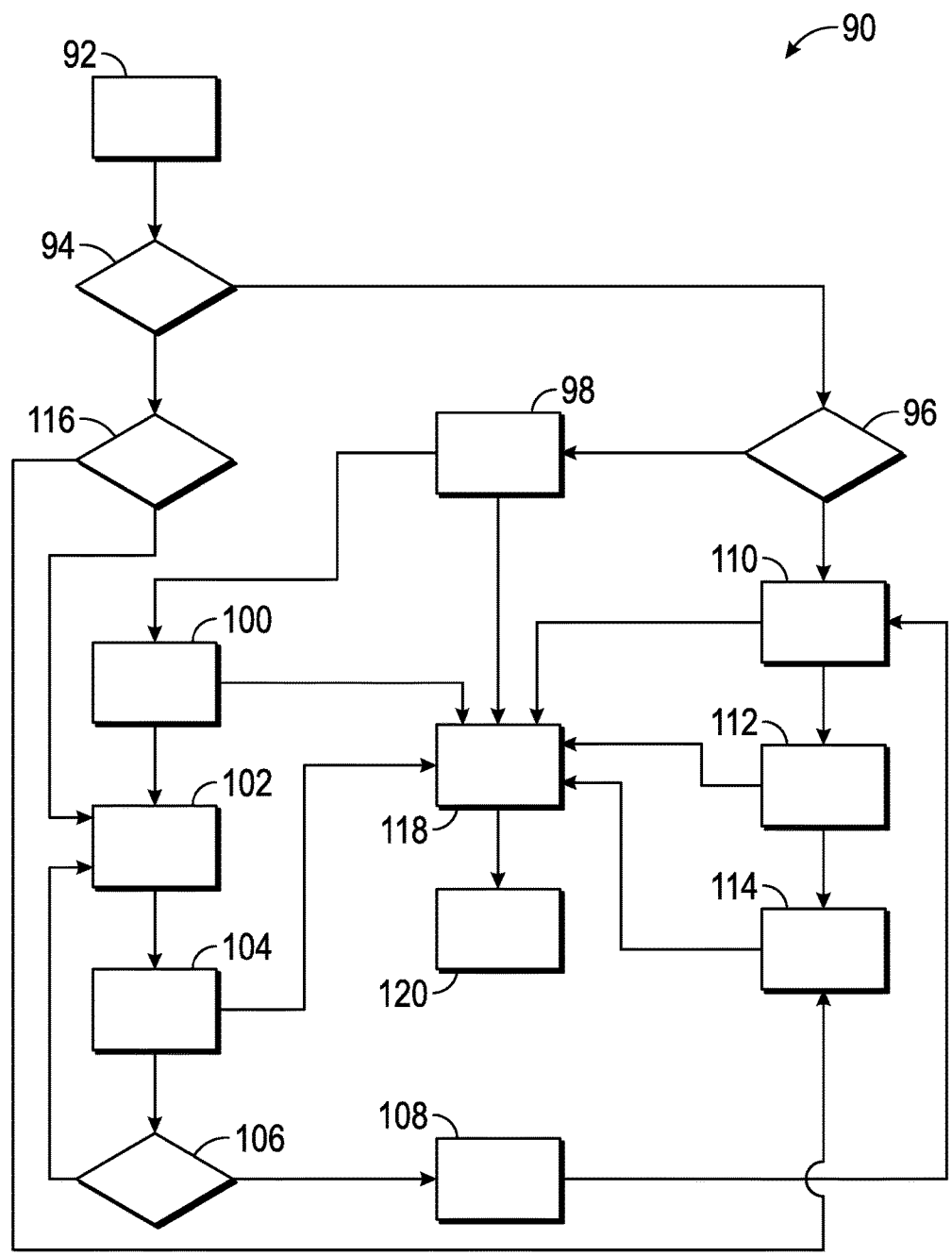
FIG. 8 is a flow chart diagram showing a process for selectively determining whether a freeze purge should be performed at fuel cell system shut-down.

FIG. 8 is a flow chart diagram 90 showing the operation of an algorithm for selectively determining whether a freeze purge of the fuel cell stack 12 and the cathode subsystem should be performed at fuel cell system shut-down. The algorithm determines that the vehicle driver has keyed-off the system 10 at box 92, and then determines whether the membrane humidification value $\lambda$ is less than a predetermined $\lambda$ value, as described in U.S. application Ser. No. 13/631,515 entitled, "Automated Cold Storage Protection For a Fuel Cell System", filed Sep. 28, 2012, published Apr. 3, 2014 as U.S. Patent Application Publication No. US 2014/0093801 A1, assigned to the assignee of this application and incorporated herein by reference. As discussed above, $\lambda$ is a representation of the water molecules in the membranes of the fuel cells in the stack 12, where the higher the value $\lambda$ the more water molecules are present. Determining the $\lambda$ value is performed because there may be certain times where significant water has not been generated in the stack 12, such as when the system 10 has only been on for a short period of time, where the $\lambda$ value will indicate that the freeze purge is not necessary. This may occur when the vehicle that includes the system 10 is started and operated for only a brief period of time, such as when moving the vehicle from one location to another to allow for snowplowing, etc. By way of example, it has been determined that a $\lambda$ value of 4 or less indicates a sufficiently dry membrane where frozen water within the stack 12 would not be a problem at the next system start-up. The $\lambda$ value can be determined by any suitable manner known to those skilled in the art. It is also known to monitor the inlet relative humidity of the cathode air to the fuel cell stack 12 that can then be used to determine the $\lambda$ value. A model can be employed based on the RH of the cathode inlet air and the amount of water that the fuel cells would generate based on stack current density. From the determined $\lambda$ value or the modeled value, the amount of water in the regions 44, 46, 48 and 50 of the cathode subsystem may be estimated.

If the $\lambda$ value is greater than 4 at the decision diamond 94, meaning there is significant water in the cell membranes, then the algorithm proceeds to decision diamond 96 to determine whether the freeze purge is necessary. Particularly, the algorithm determines whether the ambient temperature is less than a certain very low temperature, such as −15° C., where a freeze purge shut-off sequence would be necessary because the stack 12 and/or one or more of the cathode subsystem components would likely be frozen at the next system start-up. The temperature of −15° C. is by way of non-limiting example and is a calibratable temperature based on various system parameters and testing techniques for a particular fuel cell system. Thus, other temperatures may be more suitable for other systems. As will be discussed in detail below, if a freeze purge is not performed at system shut-down, then the algorithm periodically wakes up the controller 32 to determine if a freeze purge has become necessary from the last system shut-down. This periodic determination of whether a freeze purge becomes necessary requires a system warm-up before the freeze purge, which requires significant hydrogen fuel to perform the warm-up and then the freeze purge. The temperature −15° C. is selected as an optimization temperature in a non-limiting embodiment that if the ambient temperature is less than the optimization temperature, the freeze purge would be immediately performed when the stack 12 may already be warm to save the fuel required for a warm-up process prior to the freeze purge, discussed in more detail below.

If the ambient temperature is warmer than −15° C. at the decision diamond 96, meaning a freeze start-up procedure would be less likely, then the algorithm proceeds to box 98 to determine if a shut-down cathode balance of plant warm-up process to raise the balance of plant temperature to some predetermined value, such as 10° C., is needed, also discussed in more detail below. This step is usually not required, and thus the algorithm will pass through it, but may be required for a cold, but not frozen quick-key off, such as a −10° C. ambient start, a balance of plant temperature of 5°, and with a 15 second run to key-off.

The algorithm then causes the system 10 to perform a normal non-freeze shut-down at box 100 that does not include a freeze purge. The shut-down process does perform a quick shut-down purge of the stack 12, such as for 2 seconds at a purge flow of 30 g/s, where the flow rate and time would be based on the temperature of the stack 12 and the cathode balance of plant. This non-freeze purge removes water in the various channels to prevent stack damage as a result of water freezing the cathode balance of plant components discussed in detail above.

The algorithm then determines a wake-up time $T_{wake}$ at box 102 that will cause the controller 32 to wake-up to determine if a frozen purge has become necessary since the last non-freeze shut-down has been performed at the box 100. Particularly, for example, a calibratable temperature function $T_{wake}=f(T_{amb},T_{bop})$ is used to determine the next controller wake-up time, where $T_{bop}$ is the temperature of the weakest balance of plant component, for example, the backpressure valve 34, and $T_{amp}$ is the ambient temperature. The process at the box 98 is performed so that if the stack 12 has only been run for a short period of time where the cathode balance of plant is relatively cold, with the ambient temperature greater than −15° C. at the decision diamond 96, the temperature of the weakest balance of plant component, for example, the backpressure valve 34, is increased to some predetermined temperature, for example, 10° C., so that the temperature of the balance of plant used in the determination of the wake-up time $T_{wake}$ determined at the box 102 is high enough to avoid a very short $T_{wake}$ time. If $T_{wake}$ is very small, it results in an additional freeze purge cycle that may not be necessary if the driver is going to restart the car a short time later or if the ambient temperature is increasing. Once the time $T_{wake}$ is determined, the controller 32 goes to sleep at box 104 until the time $T_{wake}$ has elapsed. In one embodiment, a look-up table is provided that gives the wake-up time $T_{wake}$ for the possible combined values of the ambient temperature $T_{amb}$ and the balance of plant temperature $T_{bop}$ for temperature function.

When the controller 32 wakes-up after $T_{wake}$ has elapsed, the algorithm determines whether the function $f(T_{amb},T_{bop})$ for the combination of the ambient temperature $T_{amb}$ and the balance of plant temperature $T_{bop}$ is below a predetermined temperature, for example, 5° C., where there is a risk of a stack freeze, at decision diamond 106. If the temperature function is not less than the predetermined temperature at the decision diamond 106, then the algorithm resets the wake-up time $T_{wake}$ based on the new ambient temperature $T_{amb}$ and the balance of plant temperature $T_{bop}$ using the look-up table at the box 102, and continues this loop until there is a crank request, discussed below, or the temperature function has fallen below the predetermined temperature at the decision diamond 106. The algorithm uses the combination of the ambient temperature $T_{amb}$ and the balance of plant temperature $T_{bop}$ because different combinations of these temperatures may cause the control to do different things. For example, if the balance of plant temperature $T_{bop}$ is 2° C., but the ambient temperature $T_{amb}$ is 6° C., the algorithm may not be concerned with the cathode subsystem balance of plant temperature because the ambient temperature is warming up and the balance of plant temperature will follow accordingly. One possible function may be to always put the controller 32 back in the sleep mode with a new calculated wake-up time if the ambient temperature $T_{amb}$ is greater than the balance of plant temperature $T_{bop}$.

If the temperature function is below the predetermined temperature at the decision diamond 106, indicating a possible freeze condition, then the algorithm initiates an auto-start of the system 10 at box 108 to increase the temperature of the cathode subsystem balance of plant. The auto-start is a minimum operation of the fuel cell stack 12, where various ancillary sources, such as lights, wipers, radio, AC, etc., are kept off. After the auto-start, the system 10 is warmed up at box 110 in anticipation of the freeze purge and subsequent shut-down at box 112. The warm-up process can be performed at any suitable stack current density to any suitable temperature. In one non-limiting example, the compressor 20 is operated at 30 kW, 12% hydrogen gas is provided to the cathode, the warm-up is performed to a stack temperature of 70° C. and is held at this temperature for 30 seconds, where 30 seconds is a non-limiting calibratable time based on testing and experimentation. The warm-up process is held for the calibrated period of time so that all of the system components, including the end cells and the cathode subsystem balance of plant components, such as valves and tubing, have reached the desired temperature, here 70° C. The freeze purge is then performed at the box 112 and the controller 32 goes to sleep at box 114 with no more concerns to wake-up to determine whether a freeze purge is necessary.

If the algorithm determines that the ambient temperature $T_{amb}$ is below the calibrated temperature −15° C. at the decision diamond 96, then the algorithm proceeds directly to the shut-down warm-up process at the box 110 in preparation for the freeze purge at the box 112. As discussed above, if the ambient temperature $T_{amb}$ is below the calibratable temperature at the decision diamond 96, then the stack 12 and cathode subsystem balance of plant components almost assuredly will be frozen at the next system start-up, which would require the warm up process at the box 110 if the normal shut down was performed at the box 100. Since the stack 12 and cathode balance of plant components are likely to already be at or near the 70° C. temperature required for the warm-up at the box 110 when it is shut-down, then the algorithm proceeds directly to the box 110 to perform the freeze shut-down at the box 112 in this situation.

If the λ value is less than 4 at the decision diamond 94, then the algorithm determines whether the last system shut-down was a freeze shut-down at decision diamond 116, and if not, proceeds directly to the box 102 to determine the next wake-up time for the controller 32 to determine whether an auto-start is necessary at the box 108. If the last shut-down was a freeze shut-down at the decision diamond 116, then the algorithm proceeds directly to the box 114 until a crank request.

The shut-down sequence and key-off discussed above may be interrupted at any time by a crank request for a vehicle start-up sequence. The present invention recognizes this and allows the shut-down sequence to be interrupted at any time to respond to the crank request. Particularly, at each of the boxes 98, 100, 104, 110, 112 and 114, if a crank request is received, the algorithm will proceed to box 118, where the algorithm will then stop the shut-down step it is currently in, and proceed directly to a normal start-up sequence at box 120.

As will be well understood by those skilled in the art, the several and various steps and processes discussed herein to describe the invention may be referring to operations performed by a computer, a processor, or other electronic calculating device that manipulates and/or transforms data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system with a cathode subsystem, said cathode subsystem comprising:
    a fuel cell stack;
    a cathode inlet line that provides cathode inlet air to the fuel cell stack;
    a cathode exhaust line that exhausts a cathode exhaust gas out of the fuel cell stack; and
    a backpressure valve and a drip rail positioned in the cathode exhaust line, said backpressure valve being located downstream of the drip rail in the cathode exhaust line, wherein the drip rail includes a protrusion that is positioned on an internal wall of the cathode exhaust line at a location higher than the backpressure valve, wherein an upper surface of the protrusion is slanted downwards from the internal wall in a direction towards a sump so as to redirect condensed water to an opposite side of the cathode exhaust line and prevent the condensed water from building up near the backpressure valve, wherein the sump is positioned in the cathode exhaust line between the drip rail and the backpressure valve to collect drips of the condensed water from the upper surface of the protrusion of the drip rail.

2. The system according to claim 1 further comprising a controller that is programmed to determine a temperature of the backpressure valve and to estimate liquid water near the backpressure valve, said controller performing a freeze purge strategy if the temperature and the liquid water near the backpressure valve reach predetermined threshold values.

3. The system according to claim 1 further comprising a by-pass line that selectively directs the cathode inlet air to the cathode exhaust line using a by-pass valve, said by-pass valve located near the cathode inlet line in the by-pass line, said by-pass line including at least one turn downstream of the by-pass valve that prevents water in the cathode exhaust line from back splashing against the by-pass valve.

4. The system according to claim 1 further comprising a charge air cooler and a water vapor transfer unit in the cathode inlet line, wherein the charge air cooler is located in the cathode inlet line and feeds into the water vapor transfer unit in the cathode inlet line, said charge air cooler being cooled by a coolant loop, wherein a pressure sensor is positioned on the charge air cooler such that a pressure of the cathode inlet air is measured after the air is cooled by the charge air cooler and the pressure of the cathode inlet air is measured before the water vapor transfer unit adds water to the cathode inlet air.

5. The system according to claim 4 further comprising a drain that is directly below the water vapor transfer unit, said drain including a sump that drains liquid water from the water vapor transfer unit into the cathode exhaust line through an orifice.

6. The system according to claim 5 further comprising a screen that sits in the drain directly above the orifice, wherein a portion of the drain that includes the orifice and the screen extends into the cathode exhaust line such that heat from the cathode exhaust line is able to melt ice that may accumulate at the orifice of the drain.

7. The system according to claim 6 wherein the portion of the drain that is near the screen and the orifice is made of a thermally conductive material.

8. The system according to claim 1 wherein the backpressure valve is an inverted P-valve that is located in a hill region of the cathode exhaust line.

9. A fuel cell system with a cathode subsystem, said cathode subsystem comprising:
   a fuel cell stack;
   a cathode inlet line that provides cathode inlet air to the fuel cell stack;
   a cathode exhaust line that exhausts a cathode exhaust gas out of the fuel cell stack;
   a water vapor transfer unit that transfers humidity from the cathode exhaust gas to the cathode inlet air;
   a backpressure valve and a drip rail positioned in the cathode exhaust line, said backpressure valve being located downstream of the drip rail in the cathode exhaust line, wherein the drip rail includes a protrusion that is positioned on an internal wall of the cathode exhaust line at a location higher than the backpressure valve, wherein an upper surface of the protrusion is slanted downwards from the internal wall in a direction towards a sump so as to redirect condensed water to an opposite side of the cathode exhaust line and prevent the condensed water from building up near the backpressure valve, wherein the sump is positioned in the cathode exhaust line between the drip rail and the backpressure valve to collect drips of the condensed water from the upper surface of the protrusion of the drip rail;
   a charge air cooler that is located in the cathode inlet line and that feeds the cathode inlet air into the water vapor transfer unit, said charge air cooler being cooled by a coolant loop, wherein a pressure sensor is positioned on the charge air cooler at a location such that a pressure of the cathode inlet air is measured by the pressure sensor after the air is cooled by the charge air cooler and the pressure of the cathode inlet air is measured before the water vapor transfer unit adds the humidity to the cathode inlet air;
   a by-pass line that selectively directs the cathode inlet air from the cathode inlet line to the cathode exhaust line through a by-pass valve positioned in the by-pass line, said by-pass valve being located near the cathode inlet line in the by-pass line, said by-pass line including at least one 90° turn that is provided downstream of the by-pass valve that prevents water in the cathode exhaust line from back splashing against the by-pass valve; and
   a controller that is programmed to determine a temperature at a location of the cathode subsystem and that is programmed to estimate liquid water at the location of the cathode subsystem, said controller being programmed and configured to perform a freeze purge strategy if the temperature and the estimated liquid water at the location reach predetermined threshold values.

10. The system according to claim 9 further comprising a drain that is directly below the water vapor transfer unit, said drain including a sump that drains liquid water from the water vapor transfer unit into the cathode exhaust line through an orifice.

11. The system according to claim 10 further comprising a screen that sits in the drain directly above the orifice, wherein a portion of the drain that includes the orifice and the screen extends into the cathode exhaust line such that heat from the cathode exhaust line is able to melt ice that may accumulate at the orifice of the drain.

12. The system according to claim 10 wherein at least a portion of the drain that includes the orifice and the screen is made of a thermally conductive material.

13. The system according to claim 9 further comprising a backpressure valve in the cathode exhaust line, said cathode backpressure valve being an inverted P-valve that is located in a hill region of the cathode exhaust line.

14. The system according to claim 3 wherein the by-pass line includes a plurality of 90° turns provided downstream of the by-pass valve.

15. The system according to claim 3 wherein a distance between the by-pass valve and the cathode exhaust line is at least 20 inches.

16. The system according to claim 1 wherein the drip rail is tapered.

17. The system according to claim 1 wherein the sump is shallow enough that the sump can be cleared of water while the fuel cell system is in use.

18. The system according to claim 1 wherein the drip rail can account for a 17° grade.

19. The system according to claim 1 wherein the sump can hold less than or equal to 5 cubic centimeters of water.

20. The system according to claim 3 wherein the by-pass valve is configured to be operable at the system start-up.

* * * * *